United States Patent
Louh (10) Patent No.: US 7,796,336 B2
(45) Date of Patent: Sep. 14, 2010

(54) LENS, LENS ARRAY AND METHOD FOR MAKING LENS ARRAY

(75) Inventor: Sei-Ping Louh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/471,394

(22) Filed: May 24, 2009

(65) Prior Publication Data

US 2010/0014165 A1  Jan. 21, 2010

(30) Foreign Application Priority Data

Jul. 17, 2008  (CN) .......................... 2008 1 0302775

(51) Int. Cl.
  *G02B 27/10* (2006.01)
  *B29D 11/00* (2006.01)
(52) U.S. Cl. .................. 359/619; 264/1.38; 264/1.7
(58) Field of Classification Search .................. 359/619; 264/1.7, 1.38, 1.32
   See application file for complete search history.

(56) References Cited

U.S. PATENT DOCUMENTS

| 7,477,452 B2 * | 1/2009 | Tsuruma ..................... 359/626 |
| 7,542,101 B2 * | 6/2009 | Kume et al. .................... 349/5 |
| 2002/0008916 A1 * | 1/2002 | Nishikawa et al. ......... 359/619 |
| 2005/0254133 A1 * | 11/2005 | Akram et al. ............... 359/626 |

* cited by examiner

*Primary Examiner*—Scott J Sugarman
*Assistant Examiner*—Vipin M Patel
(74) *Attorney, Agent, or Firm*—Raymond J. Chew (57) ABSTRACT

An exemplary lens includes a light pervious substrate, a first optically active part, and a light blocking film. The light pervious substrate has a first surface, an opposite second surface, and a recess defined in the first surface. The recess includes a bottom surface. The first optically active part is formed on the bottom surface. The light blocking film is formed on the bottom surface surrounding the first optically active part.

5 Claims, 11 Drawing Sheets

LENS, LENS ARRAY AND METHOD FOR MAKING LENS ARRAY

BACKGROUND

1. Technical Field

The present invention relates to imaging technology, and particularly to a lens, a lens array, and a method for making a lens array.

2. Description of Related Art

Nowadays, lens modules have been widely used in various portable electronic devices. The lens modules of portable electronic devices have become smaller and smaller in size. Accordingly, optical elements (e.g., lenses) used in such lens module also need to have a smaller size/volume.

However, small lenses tend to bend or crack. Furthermore, the yield rate of small lenses is usually low.

Therefore, a new lens, a new lens array and a method for making the lens array are desired to overcome the above mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
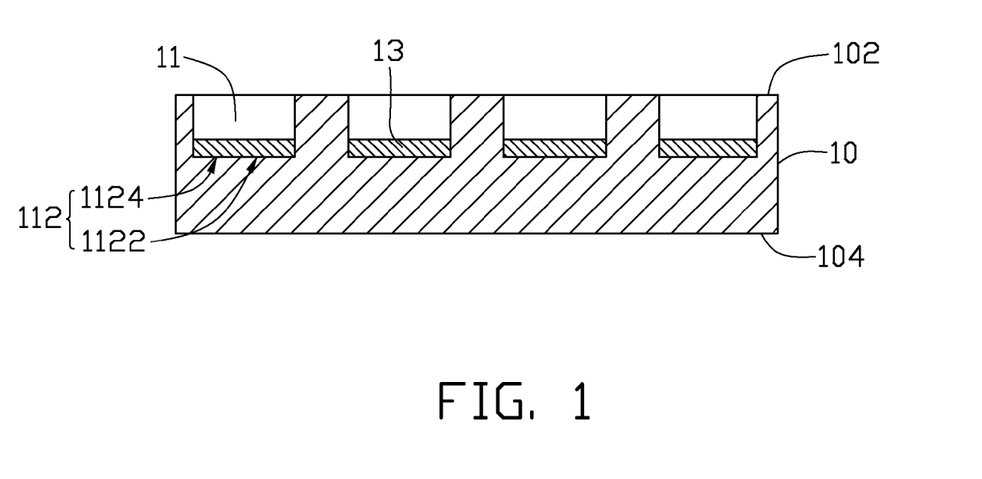
FIGS. 1-10 show successive stages of making a lens array according to an exemplary embodiment.

Referring to FIG. 1, a light pervious substrate 10 is provided, and the light pervious substrate 10 includes a first surface 102 and an opposite second surface 104.

A plurality of recesses 11 arranged in an array, e.g. in columns and rows, and are formed in the first surface 102 by etching, e.g., sputter etching, ion beam etching.

A photoresist layer 13 is formed on a bottom surface 112 in each recess 11 by, for example, slit coating. The bottom surface 112 includes a central portion 1122 and a peripheral portion 1124 surrounding the central portion 1122. In the present embodiment, the photoresist layer 13 is a negative photoresist layer.

The photoresist layer 13 is then exposed to UV light using a photomask (not shown) with a predetermined pattern.

Figure 2:
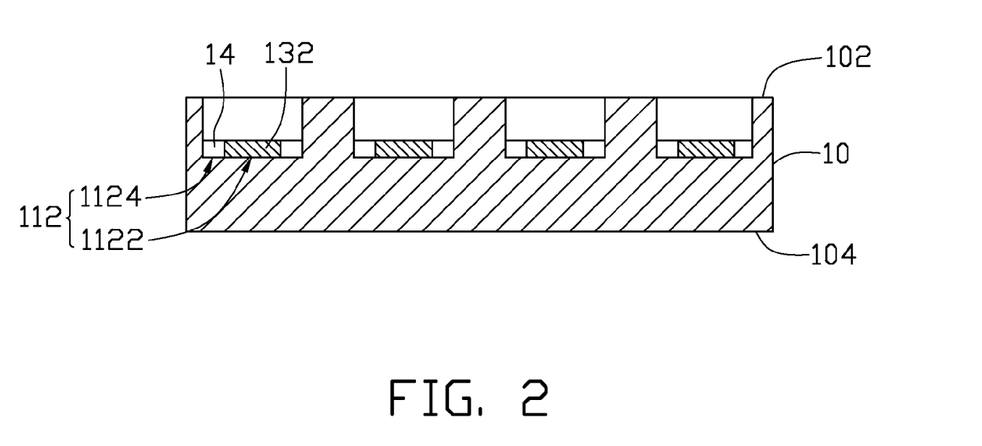

Referring to FIG. 2, the photoresist layer 13 is developed such that unexposed portions of the photoresist layer 13 is removed and exposed portions 132 of the photoresist layer 13 remain. In this way, the peripheral portion 1124 of the bottom surface 112 is exposed.

Figure 3:
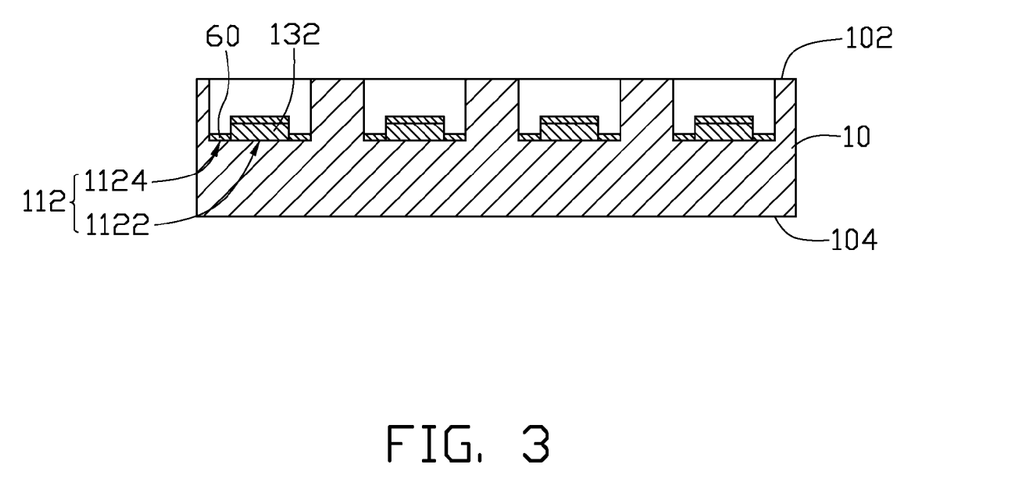

Referring to FIG. 3, a light blocking film 60 is formed on the peripheral portion 1124 of the bottom surface 112 and on the exposed portions 132. It should be noted that the light blocking film 60 can only be formed on the peripheral portion 1124 of the bottom surface 112.

Figure 4:
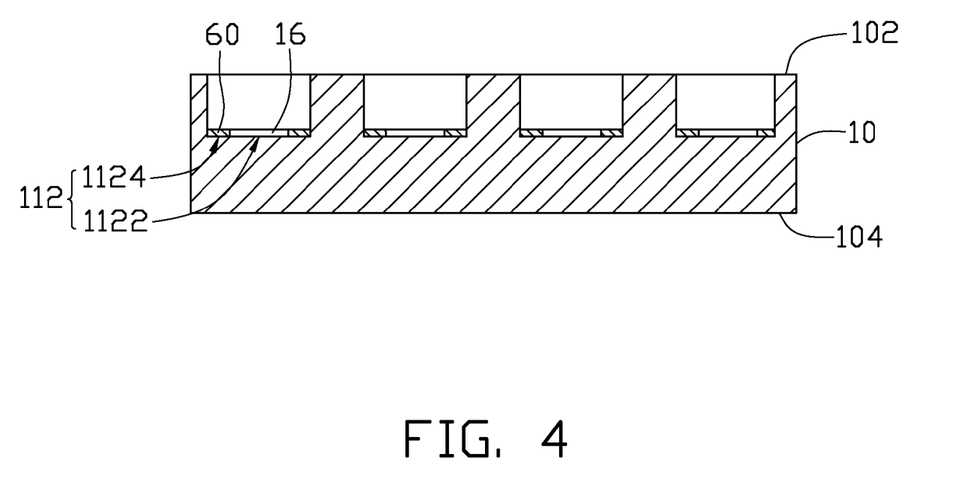

Referring to FIG. 4, the exposed portions 132 together with the light blocking film 60 formed thereon are removed so that the central portion 1122 of the bottom surface 112 is exposed.

Figure 5:
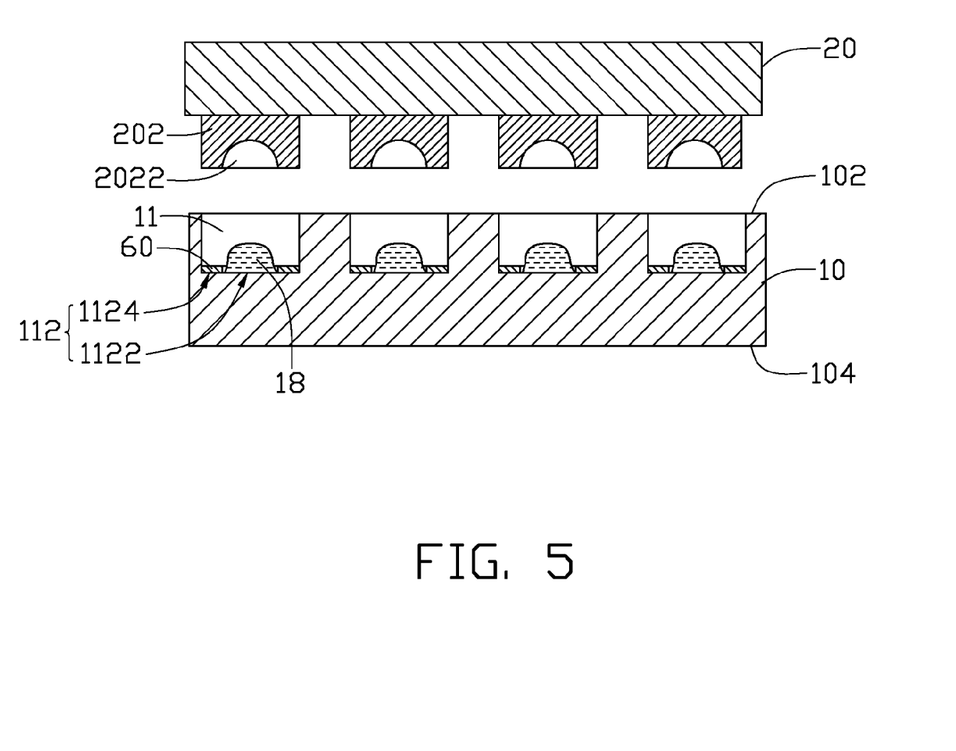

Referring to FIG. 5, a pressing mold 20 is provided. The pressing mold 20 includes a plurality of molding parts 202 corresponding to the plurality of recesses 11. The size of each molding part 202 is smaller than the size of each recess 11 so that the molding part 202 can be inserted into the recess 11. Each molding part 202 defines a molding cavity 2022 for forming an optically active part of a lens. In the present embodiment, the molding cavity 2022 is a hemisphere.

Liquid or molten molding material 18 is applied on the central portion 1122 of the bottom surface. The molding material 18 can be thermoplastic or thermalsetting material.

Figure 6:
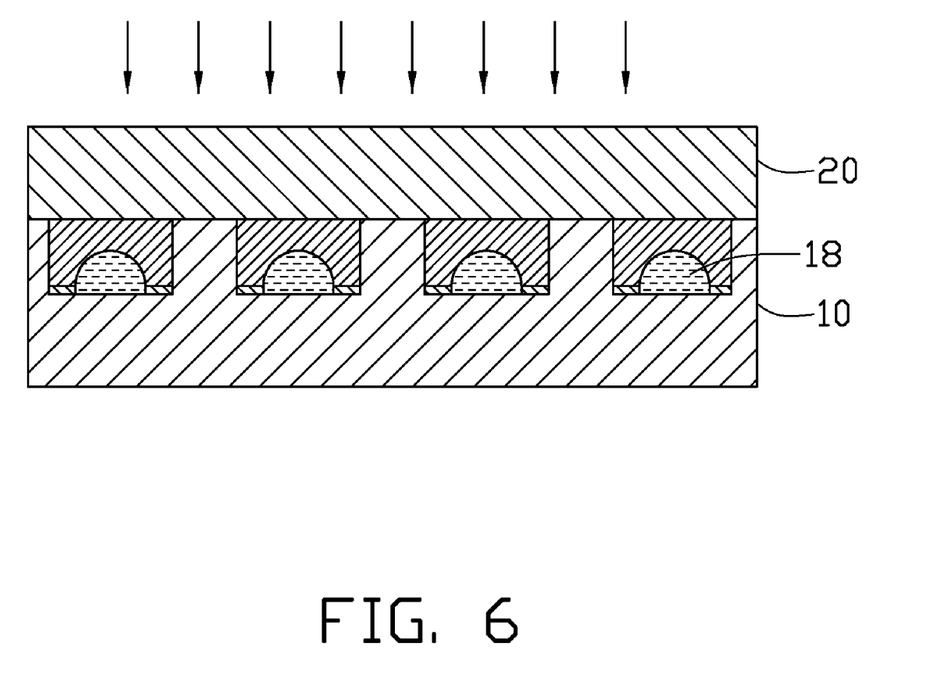

Referring to FIG. 6, the molding material 18 is pressed by the pressing mold 20 and then solidified by irradiating UV light on the molding material 18.

Figure 7:
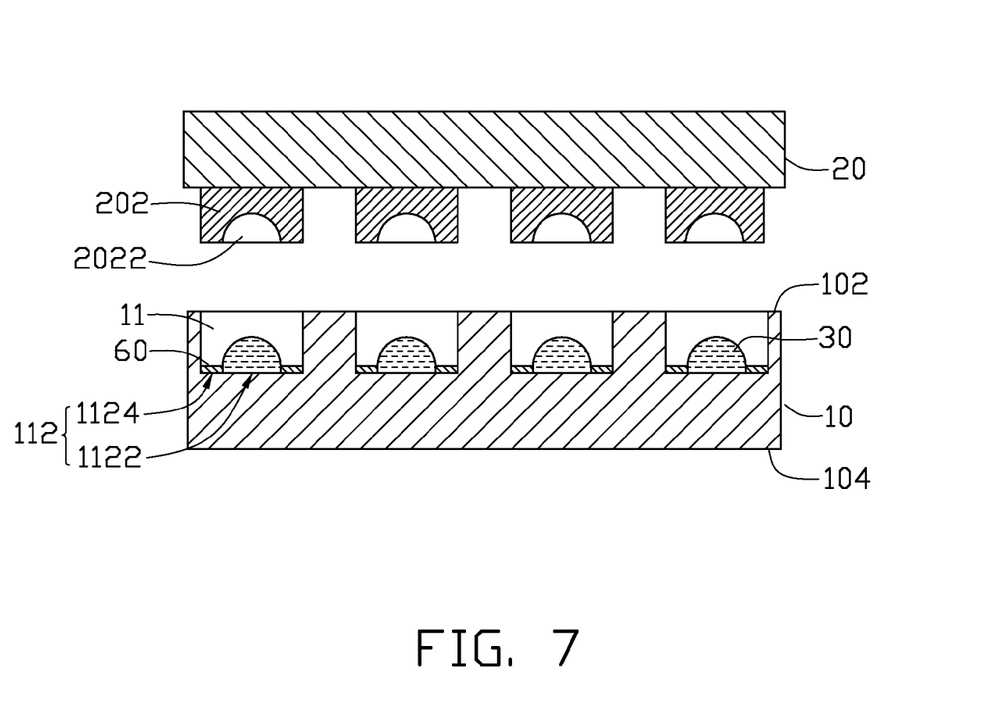

Referring to FIG. 7, the pressing mold 20 is removed and a plurality of first optically active parts 30 are formed on the central portion 1122 of the bottom surface 112. The depth of each recess is larger than the thickness of each first optically active part 30.

Figure 8:
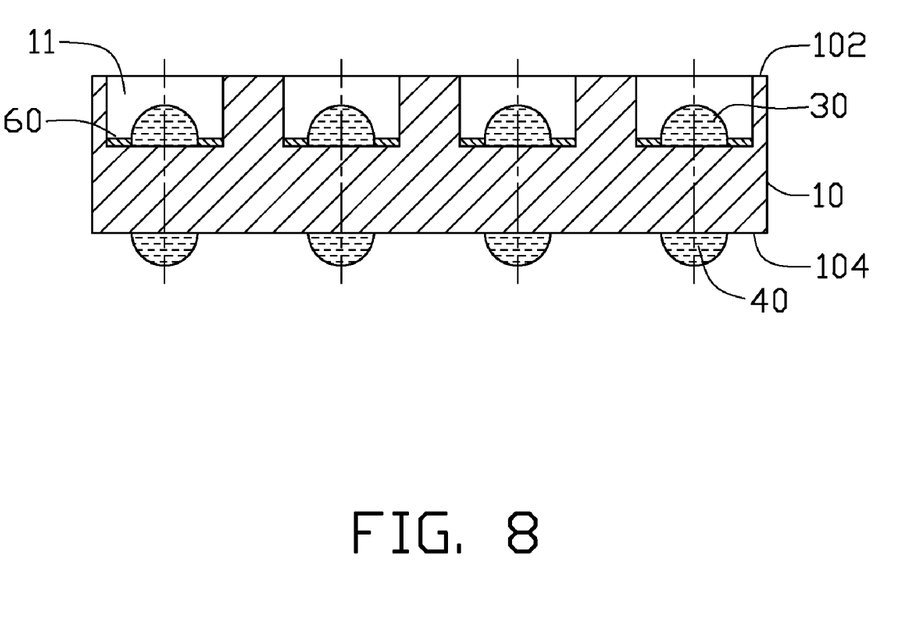

Referring to FIG. 8, similar to the method of forming the first optically active part 30 shown in FIGS. 5-7, a plurality of second optical active parts 40 are formed on the second surface 104 of the light pervious substrate 10. Each second optical active part 40 is spatially corresponding to the corresponding first optical active part 30. An optical axis (not labeled) of each second optical active part 40 aligns with an optical axis (not labeled) of each corresponding first optical active part 30.

Figure 9:
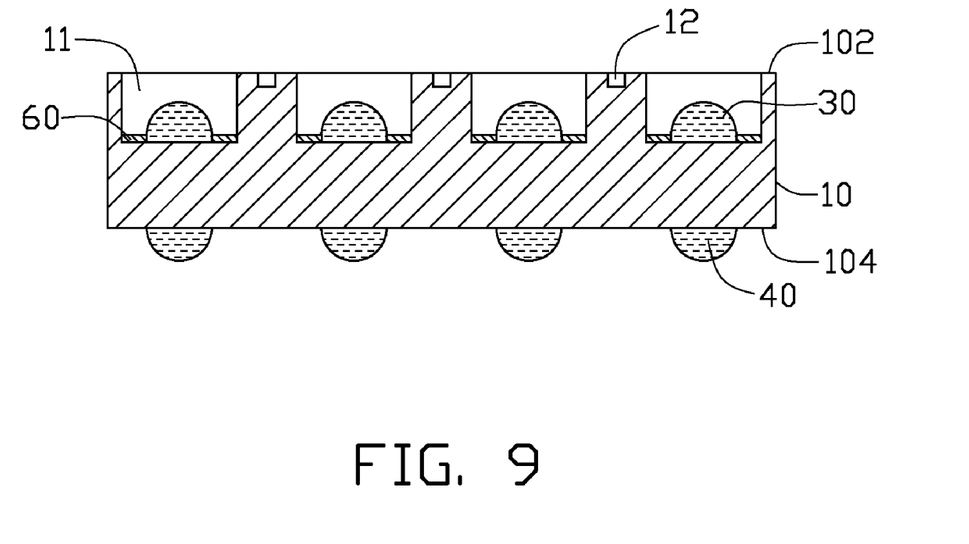

Referring to FIG. 9, a plurality of cutting grooves 12 are formed in the first surface 102 between two adjacent recesses 11.

Figure 10:
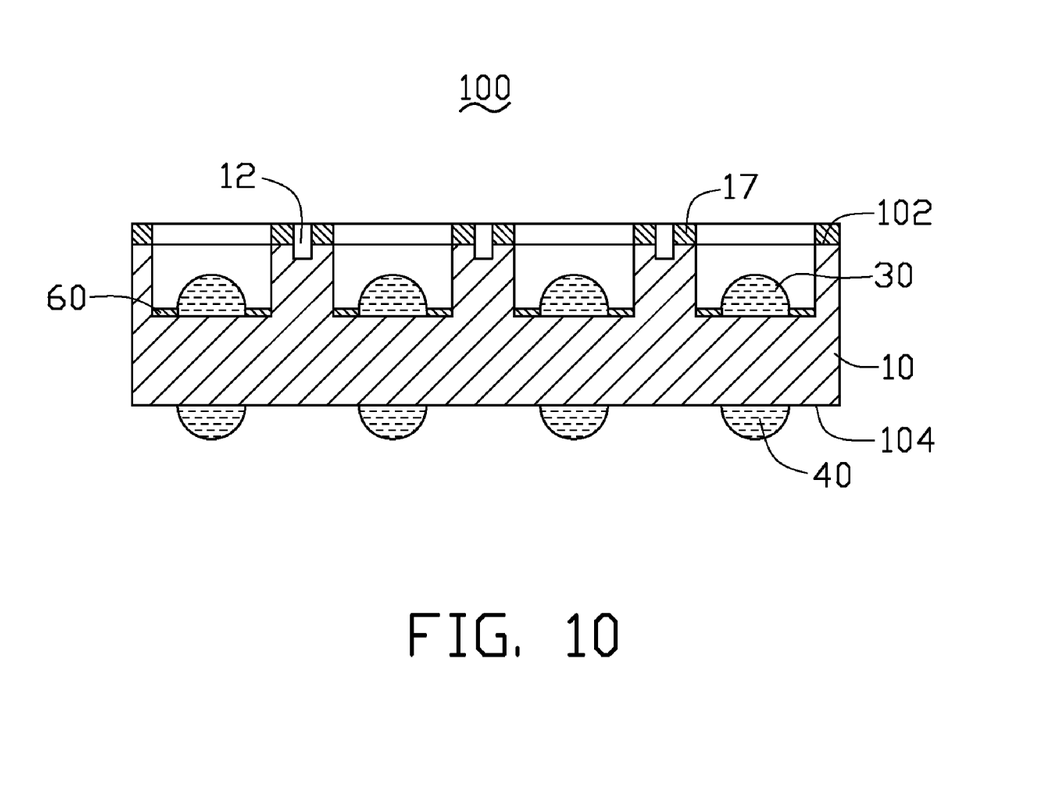
Figure 11:
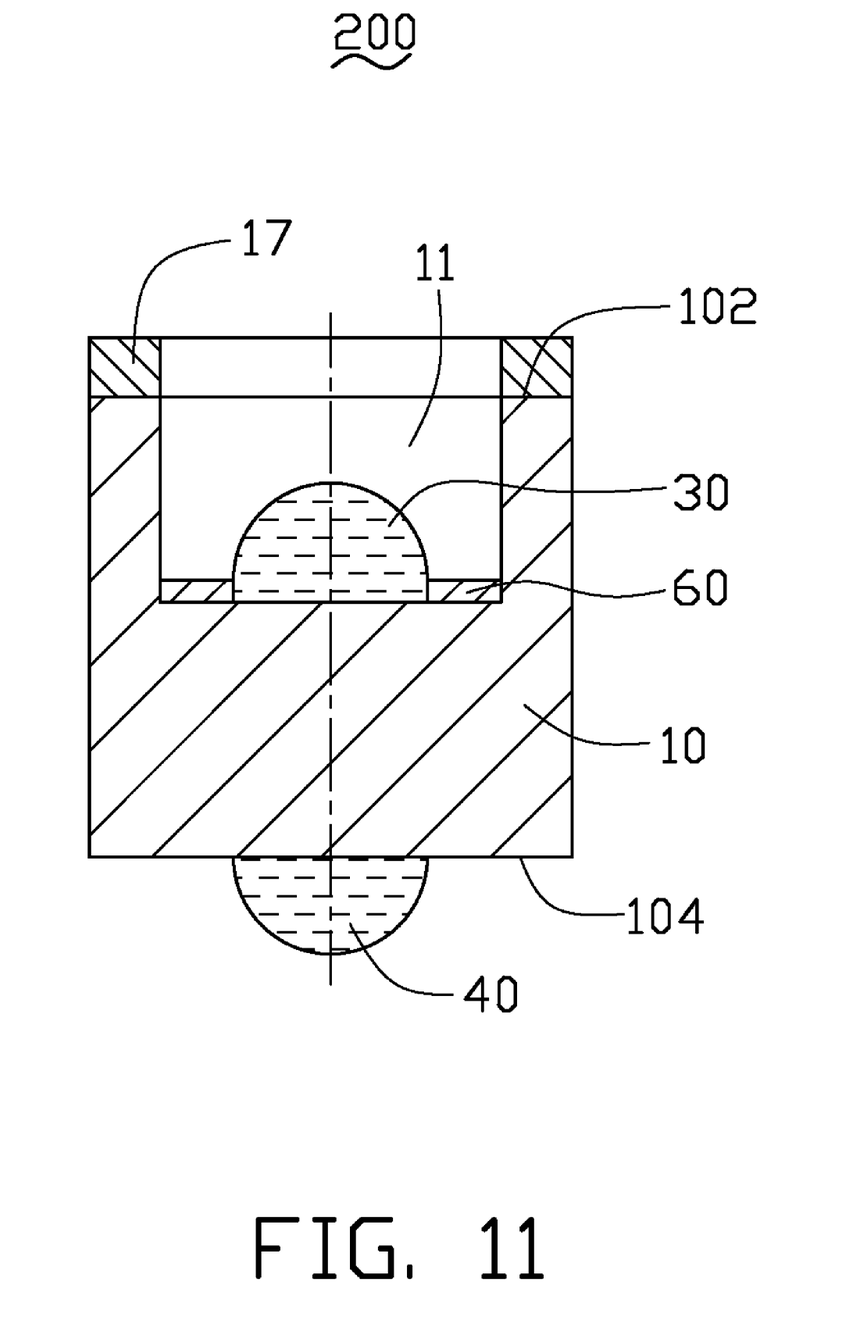
FIG. 11 is a cross-sectional view of a lens according to the exemplary embodiment.

Referring to FIG. 10, an adhesive layer 17 is formed on the first surface 102 of the light pervious substrate 10. Thus, a lens array 100 is formed. The adhesive layer 17 is configured for attaching other optical elements on the lens array 100. Then, the lens array 100 is cut along the cutting grooves 12 into a plurality of individual lens 200, one of which is shown in FIG. 11.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A method for making a lens array, the method comprising: providing a light pervious substrate having a first surface and an opposite second surface; forming a plurality of recesses in the first surface of the light pervious substrate, each recess comprising a bottom surface, the bottom surface comprising a central portion and a peripheral portion; forming a light blocking film on the peripheral portion of the bottom surface; depositing molding material on the central portion of the bottom surface; pressing the molding material using a pressing mold; and solidifying the molding material to form a first lens part on the central portion of the bottom surface.

2. The method of claim 1, further comprising: after forming the first lens part, forming a second lens part on the second surface, wherein the first lens part and the second lens part have a common optical axis.

3. The method of claim 1, wherein the step of forming the light blocking film further comprises:

forming a photoresist layer on the bottom surface;
    removing a first portion of the photoresist layer on the peripheral portion; and forming the light blocking film on the peripheral portion of the bottom surface.

4. The method of claim 1, further comprising: forming an adhesive layer on the first surface after the first Lens part is formed.

5. The method of claim 1, further comprising: forming a plurality of cutting groove between two adjacent recesses after the first lens part is formed.

* * * * *